United States Patent
Dow et al.

(10) Patent No.: US 11,322,033 B2
(45) Date of Patent: May 3, 2022

(54) REMOTE SURFACE CONDITION ASSESSMENT

(71) Applicant: International Business Machines Corporation, Armonk, NY (US)

(72) Inventors: Eli M. Dow, Wappingers Falls, NY (US); Campbell D. Watson, Brooklyn, NY (US); Guillaume A. R. Auger, White Plains, NY (US); Michael E. Henderson, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/551,817

(22) Filed: Aug. 27, 2019

(65) Prior Publication Data

US 2021/0065565 A1 Mar. 4, 2021

(51) Int. Cl.
*G08G 5/00* (2006.01)
*B60W 40/06* (2012.01)
(Continued)

(52) U.S. Cl.
CPC ........... *G08G 5/0086* (2013.01); *B60W 40/06* (2013.01); *B64C 39/024* (2013.01);
(Continued)

(58) Field of Classification Search
CPC .................................................. G08G 5/0086
See application file for complete search history.

(56) References Cited

U.S. PATENT DOCUMENTS 8,776,074 B1 * 7/2014 Heisler .............. G06Q 10/0631
718/103
9,463,875 B2 10/2016 Abuelsaad et al.
(Continued)

FOREIGN PATENT DOCUMENTS

CN 104269054 A 1/2015
CN 204405065 U 6/2015
(Continued)

OTHER PUBLICATIONS

NPL, Heliguy. (Aug. 28, 2015,). Infrared and Thermal Sensors on Drones. Retrieved Oct. 7, 2017, from Heliguy: https://www.heliguy.com/blog/2015/08/28/infrared-and-thermalsensors-on-drones (Hereinafter Heliguy).*
(Continued)

*Primary Examiner* — Jean Paul Cass
(74) *Attorney, Agent, or Firm* — Matthew J. Bussan

(57) ABSTRACT

Method, apparatus, and computer program product are provided for assessing road surface condition. In some embodiments, candidate locations each forecast to have a dangerous road surface condition are determined, an optimized flight path is determined comprising a sequence of sites corresponding to the candidate locations, dispatch is made to a first site within the sequence, and a road surface condition at the first site is assessed using an onboard sensor (e.g., spectroradiometer). In some embodiments, a check for new information is performed before dispatch is made to a second site. In some embodiments, the candidate locations are determined using both a model forecast and data-mined locations considered hazardous. In some embodiments, the optimized flight path is determined using TSP optimization constrained by available flight time and prioritized by frequency of historical incident and severity of forecast road surface condition.

17 Claims, 10 Drawing Sheets

(51) Int. Cl.
*B64C 39/02* (2006.01)
*G06V 20/10* (2022.01)

(52) U.S. Cl.
CPC ......... *G06V 20/182* (2022.01); *G08G 5/0021* (2013.01); *G08G 5/0034* (2013.01); *B60W 2554/00* (2020.02); *B60W 2555/20* (2020.02); *B64C 2201/127* (2013.01)

(56) References Cited

U.S. PATENT DOCUMENTS

| | | | | |
|---|---|---|---|---|
| 9,589,448 | B1* | 3/2017 | Schneider | F41H 11/00 |
| 9,734,725 | B2 | 8/2017 | Gordon et al. | |
| 10,043,376 | B1* | 8/2018 | Poornachandran | G08B 25/016 |
| 10,055,984 | B1 | 8/2018 | Schaeffer et al. | |
| 10,078,808 | B1* | 9/2018 | Sibon | G05D 1/0676 |
| 10,227,178 | B2* | 3/2019 | High | B60P 3/20 |
| 10,334,412 | B1* | 6/2019 | Kenane | B60W 40/06 |
| 10,395,332 | B1* | 8/2019 | Konrardy | G05D 1/0246 |
| 10,456,912 | B2* | 10/2019 | Baroudi | B25J 9/1602 |
| 10,496,095 | B1* | 12/2019 | Bays | B64C 39/024 |
| 10,574,339 | B2* | 2/2020 | Chandra | H04B 17/318 |
| 10,639,956 | B2* | 5/2020 | Cantrell | G05B 6/02 |
| 10,861,305 | B2* | 12/2020 | Gordon-Carroll | G08B 13/19656 |
| 11,003,184 | B2* | 5/2021 | Magalhães de Matos | H04L 67/10 |
| 2015/0226575 | A1* | 8/2015 | Rambo | G08G 5/0034 701/523 |
| 2015/0339919 | A1 | 11/2015 | Barnett et al. | |
| 2015/0370251 | A1 | 12/2015 | Siegel et al. | |
| 2016/0069743 | A1 | 3/2016 | McQuilkin et al. | |
| 2017/0129491 | A1* | 5/2017 | Tatourian | G08G 1/0141 |
| 2017/0201779 | A1* | 7/2017 | Publicover | G06F 16/2358 |
| 2018/0061235 | A1 | 3/2018 | Goldberg et al. | |
| 2018/0188728 | A1 | 7/2018 | Erickson et al. | |
| 2018/0190042 | A1 | 7/2018 | Gordon et al. | |
| 2018/0272920 | A1 | 9/2018 | Gordon et al. | |
| 2018/0273175 | A1* | 9/2018 | Klettke | G08G 5/0021 |
| 2019/0162714 | A1* | 5/2019 | Karimi | G01N 33/48771 |
| 2021/0065565 | A1* | 3/2021 | Dow | G08G 5/0013 |

FOREIGN PATENT DOCUMENTS

| | | | | |
|---|---|---|---|---|
| CN | 105929439 | A | 9/2016 | |
| KR | 101365634 | B1 | 2/2014 | |
| WO | 2015189283 | A1 | 12/2015 | |
| WO | WO202005597 | A1 * | 3/2019 | G06Q 40/04 |
| WO | WO2019083791 | A1 * | 5/2019 | G06Q 40/04 |

OTHER PUBLICATIONS

NPL, Shamsi et al., Foggy drone: Application to a hexarotor UAV, 2018 Advances in Science and Engineering Technology International Conferences (ASET), Feb. 6, 2018).*
Google patents machine translation of WO2019083791A1 to Loveland et al.*
Mell et al., "The NIST Definition of Cloud Computing", National Institute of Standards and Technology, NIST Special Publication 800-145, Sep. 2011, 7 pages.
Riehm et al., "Ice formation detection on road surfaces using infrared thermometry", Cold Regions Science and Technology, vols. 83-84, 2012, pp. 71-76.
Unknown, "ASD FieldSpec4 Hi-Res: High Resolution Spectroradiometer", 2 pages, printed from <https://www.malvernpanalytical.com/en/products/product-range/asd-range/fieldspec-range/fieldspec4-hi-res-high-resolution-spectroradiometer/index.html> on May 29, 2019.
Unknown, "UAV Road Surface Monitoring and Traffic Information", 25 pages, downloaded from <http://www.evolvsys.cz/files/100628-ESC_ITS&S_Czech_Republic_ARTES20.pdf> on May 29, 2019.
Unknown, "Our ASD FieldSpec HandHeld 2 on a drone!", 2 pages, printed from <https://www.facebook.com/MalvernPanalytical/photos/our-asd-fieldspec-handheld-2-on-a-drone-here-it-is-paired-with-an-rgb-camera-set/10156692104097988/> on Jun. 7, 2019.
Haavasoja et al., "Experiences of Mobile Road Condition Monitoring", 14 pages, downloaded from <http://www.sirwec2012.fi/Presentations/t08_Haavasoja_014.pdf> on Jun. 5, 2019.
Casselgren, Johan, "Road surface classification using near infrared spectroscopy", 104 pages, downloaded from <https7/www.researchgate.net/profile/Johan_Casselgren/publication/228867322_Road_surface_classification_using_near_infrared_spectroscopy/links/569ced0008ae5c9fe6c0f641/Road-surface-classification-using-near-infrared-spectroscopy.pdf?origin=publication_detail> on Jun. 5, 2019.
Unknown, "Use of Mobile Sensors and Maintenance Decision Support for Automated Road Condition Reporting", 48 pages, downloaded from <https://www.nwpassage.info/projects/phase5/downloads/proj54-mobile-sensors-report.pdf> on Jun. 7, 2019.
Jonsson, Patrik, "Surface Status Classification, Utilizing Image Sensor Technology and Computer Models", 104 pages, downloaded from <http://www.diva-portal.org/smash/get/diva2:805161/FULLTEXT01.pdf> on Jun. 7, 2019.
Unknown, "Cognitive Road Hazard Life Cycle Management", An IP.com Prior Art Database Technical Disclosure, IP.com No. IPCOM000248334D, 4 pages, Nov. 15, 2016.
English Language Translation of DE102016204237A1, 15 pages, Sep. 21, 2017.

* cited by examiner

REMOTE SURFACE CONDITION ASSESSMENT

BACKGROUND

The present invention relates in general to the field of road surface condition assessment. More particularly, the present invention relates to remote road surface condition assessment.

SUMMARY

Embodiments of the present disclosure include a method, apparatus, and computer program product for assessing road surface condition. In some embodiments, a plurality of candidate locations each forecast to have a dangerous road surface condition are determined, an optimized flight path for an aerial drone is determined that comprises a sequence of sites each corresponding to one of the plurality of candidate locations, the aerial drone is dispatched to a first site within the sequence of sites that comprise the optimized flight path, and a road surface condition at the first site is assessed using a sensor (e.g., spectroradiometer) onboard the aerial drone. In some embodiments, a check for new information is performed before the aerial drone is dispatched to a second site within the sequence of sites that comprise the optimized flight path. In some embodiments, the plurality of candidate locations are determined using both a model forecast and data-mined locations considered hazardous. In some embodiments, the optimized flight path is determined using travelling salesman problem (TSP) optimization constrained by flight time available to the aerial drone and prioritized by frequency of historical incident and severity of forecast road surface condition.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
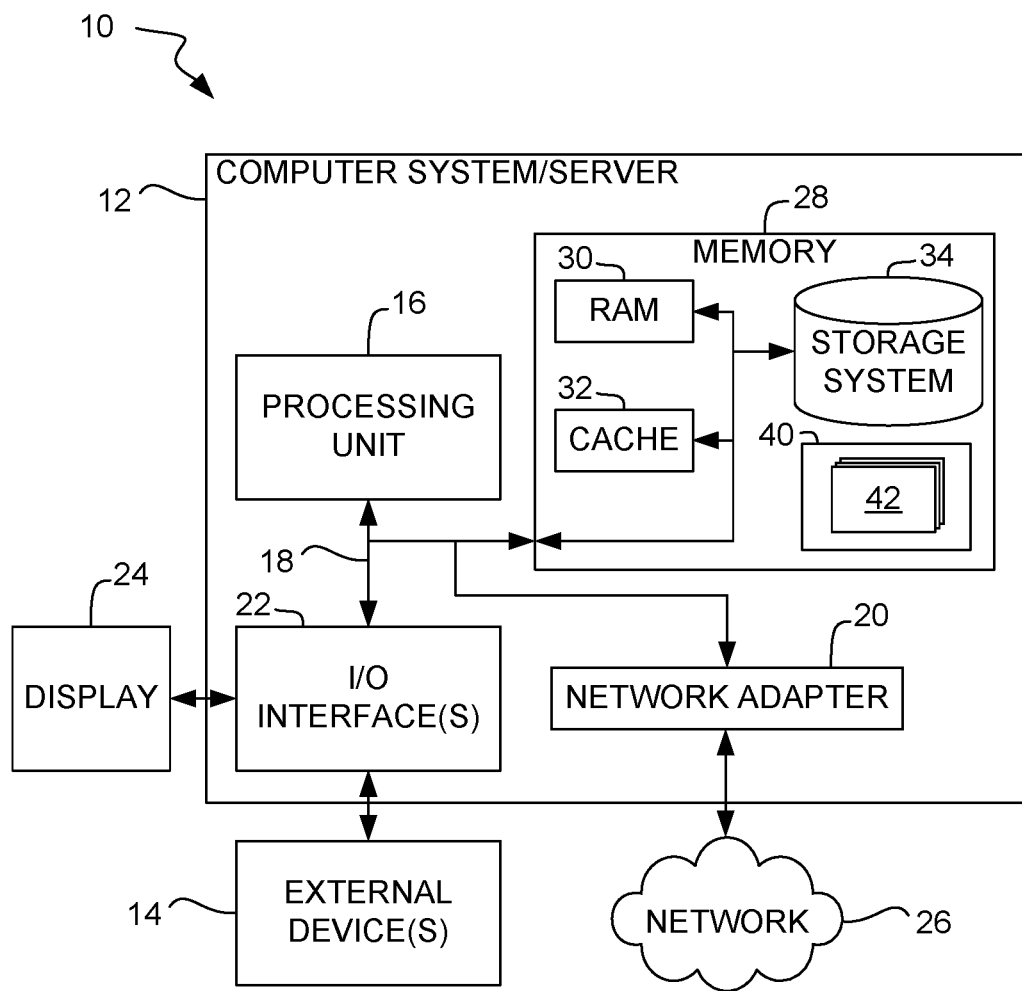
FIG. 1 depicts a cloud computing node, according to one or more embodiments.

Road surface conditions are often unpredictable during winters in countries with a temperate climate where rapid transitions between dry, wet, snow, and ice covered surfaces are common. A reliable forecast of road surface condition (e.g., icy, wet, snow) would lead to a decrease in road accidents and lower costs for vehicle owners and occupants (e.g., auto repairs, emergency room visits, and the like) and insurance companies. In some instances, numerical models are used to predict ground surface conditions. The FASST model, from the U.S. Army Corps of Engineers, is one such model (FASST stand for "Fast All-season Soil Strength"). Using both meteorological and terrain data, FASST may be used to calculate a road's moisture content, ice content, temperature, and freeze/thaw profiles, as well as soil strength and surface ice and snow accumulation/depletion. However, validating and calibrating predictive models such as the FASST model requires observations. Observations of "detection"/"no detection" of dangerous conditions (e.g., ice or pooled water) also serve as useful validation for predictive models such as the FASST model, allowing improvements in future forecasts through calibration.

Unfortunately, such observations are not always available. Currently available products provide information on road conditions through cameras (e.g., The Weather Channel) or crowd-sourced data (e.g., Google Maps). However, currently available products such as these typically focus on roads with substantial activity. No data are available, or are scarce, for less active roads. Although such roads are relatively less active, they nevertheless are used by freighting trucks and local residents.

To mitigate the issue of limited observations and improve the forecast of road surface condition, in accordance with some embodiments, an aerial drone is equipped with a sensor package to assess the condition of the road (e.g., ice, temperature, moisture content of the surface of the road, and the like). The combination of an aerial drone and a sensor package to assess the condition of the road makes observations of road surface condition more easily obtainable, with no issue with cloud cover. Accordingly, assessment of road surface condition may be provided wherever a road is forecast to have surface condition that is potentially dangerous (including less travelled roads).

An aerial drone, also known as an unmanned aerial vehicle (UAV) or a flying drone, is an unmanned airborne vehicle that is capable of being piloted without an on-board human pilot. If autonomously controlled using an on-board computer and pre-programmed instructions, a UAV is called an autonomous drone. Such an aerial drone (autonomous drone) is referred to herein as operating in "autonomous mode". If remotely piloted by a human pilot, the UAV is called a remotely piloted aircraft (RPA). Such an aerial drone (RPA) is referred to herein as operating in "remotely-piloted mode".

Existing techniques for observing road surface conditions are highly local (e.g., electrical conductivity, changes in albedo, image processing, and the like). These existing techniques typically provide one data point for a section of road. More recently, spectroscopy has been adopted whereby light is emitted towards the road surface in one or more different wavelengths, typically in the near infrared spectra. Depending on the road surface status, the light is reflected back towards a detector in the sensor and thereafter analyzed in order to determine whether the surface is dry, wet, or icy. See, Riehm et al., "Ice formation detection on road surfaces using infrared thermometry," Cold Regions Science and Technology, Vols. 83-84, 2012, pp 71-76.

In accordance with some embodiments, a system deploys one or more sensor equipped aerial drones intelligently to validate forecasts of road surface condition, alerting on dangerous conditions to road users and/or local authorities (e.g., a central dispatcher for snow plows and salt trucks) across a plurality of locations. For example, such a system may provide road surface condition information for the driver of a vehicle and/or for one or more systems in the vehicle responsible for assisting driver, such as a navigation system, electronic stability control (ESC), anti-lock brake system (ABS), and traction control system (TCS). The system may, for example, classify the road surface condition (e.g., "dry", "wet", "icy", "snowy", and the like) and send this road surface condition information to the vehicle before the vehicle passes the road surface. For example, the navigation system may receive information that a dangerous road surface condition lies ahead on the planned route and offer the driver an option to select an alternative route that does not contain a dangerous road surface condition. In another example, the TCS may receive information that a dangerous road surface condition lies ahead and reduce power to one or more drive wheels before any such drive wheel loses traction.

The sensor that the aerial drone is equipped with measures light reflected from a road surface at one or more wavelengths, typically in the near infrared (NIR) and short-wavelength infrared (SWIR) spectra. If the aerial drones are deployed during daylight, either solar illumination or artificial illumination may be used as the light source. If the aerial drones are deployed at night, nighttime viable sensors (e.g., infrared, microwave, etc.) are used and the road surface is illuminated artificially to create daylight conditions.

Example sensors suitable for this application include: ASD FieldSpec® 4 Hi-Res high resolution spectroradiometer [spectral range=350-2500 nm] from Analytical Spectral Devices, Inc. (ASD) based in Longmont, Colo. The ASD FieldSpec® 4 Hi-Res high resolution spectroradiometer includes near infrared (NIR) and short-wavelength infrared (SWIR) for discriminating between water and ice on road surfaces.

A spectroradiometer measures both the wavelength and amplitude of the light emitted from a light source (e.g., light reflected from a road surface). Wavelength discrimination is based on the position where the light strikes the detector array. Advantageously, this allows the full spectrum, or at least several different wavelengths, to be obtained with a single acquisition.

Example sensors suitable for this application also include: Thermal cameras (long wavelength infrared) for measuring the temperature on road surfaces. Thermal cameras are also referred to herein as "infrared temperature sensors".

Other example sensors suitable for use in this application include: Micro-Hyperspec® Imaging Sensors (e.g., the NIR version [spectral range=900-1700 nm], the Extended VNIR version [spectral range=600-1700 nm], and the SWIR version [spectral range=900-2500 nm]) and Hyperspec® Co-Aligned VNIR-SWIR Sensor [spectral range 400-2500 nm] from Headwall Photonics Inc. based in Bolton, Mass.

Still other example sensors suitable for use in this application include: Vaisala Mobile Detector MD30 (Vaisala Oyj, based in Vantaa, Finland) and Road Condition Monitor RCM411 (Teconer Oy, based in Helsinki, Finland). The Vaisala Mobile Detector MD30, for example, uses DCS laser technology optimized for mobile measurements to provide quick response time and high sensitivity in road surface condition reporting. These sensors may be used to perform various measurements such as road surface condition (dry, moist, wet, icy, snowy, slushy), water/ice layer thickness, and surface temperature. The road surface condition data may be communicated from these sensors to selected servers (e.g., a central server) via Bluetooth link or serial RS-232 connection to a cell phone, PC, or other system onboard the aerial drone.

In accordance with some embodiments, the road surface condition data obtained from the Road Condition Monitor RCM411 or the Vaisala Mobile Detector MD30 (and/or other suitable sensor(s) onboard the aerial drone) may be plotted on a map interface (e.g., at a central server, a snow plow's dispatch system display, a vehicle's navigation system display, and the like) as color coded lines. For example, a central server may receive road surface condition data from one or more aerial drones and display dangerous road surface conditions on a map interface as color coded lines. In another example, a snow plow's dispatch system may receive information from a central dispatcher dispatching the snow plow to a dangerous road surface condition observed by an aerial drone and the snow plow's dispatch system display may show the dangerous road surface condition on a map interface as color coded lines. In yet another example, a vehicle's navigation system may receive information from a central server that a dangerous road surface condition observed by an aerial drone lies ahead on its planned route, display the dangerous road surface condition on a map interface as color coded lines, and offer the driver an option to select an alternative route that does not contain a dangerous road surface condition. In still another example, a vehicle's traction control system (TCS) may receive information from a central server that a dangerous road surface condition observed by an aerial drone lies ahead and reduce power to one or more drive wheels before any such drive wheel loses traction.

Drone observations of "detection"/"no detection" of dangerous conditions (e.g., ice or pooled water) provide material for validation and improvement of forecasts of road surface conditions. When forecasting road surface condition, a false positive (e.g., a clear road was predicted, but the road is icy) is a highly undesirable outcome. Improvement in future forecasts through calibration using drone observations of "detection"/"no detection" of dangerous conditions, in accordance with some embodiments, may serve to reduce the frequency of false positives forecast by predictive models. For example, measured values may be used automatically for calibrating the next subsequent forecast.

In accordance with some embodiments, aerial drone observations of "detection"/"no detection" of dangerous conditions (e.g., ice or pooled water) at one or more sites, each forecast by one or more prediction models to have a dangerous condition, serve as useful validation for the one or more prediction models, allowing improvements in future forecasts through calibration. For example, a cognitive predictive machine learning and data mining-based approach may be used so that, over time, as more and more aerial drone observations of "detection"/"no detection" of dangerous road condition are collected and/or more and more data (e.g., historical accident data) are mined, cognitive learning occurs. In accordance with some embodiments, cognitive machine learning algorithms may provide, over time, insight into calibrating one or more prediction models to improve subsequent forecasts. Cognitive machine learning algorithms may, for example, recognize that forecast road surface conditions at one or more sites forecast using two or more prediction models improve as the relative weightings of the prediction models deemphasize one of the prediction models and emphasize another of the prediction models.

In accordance with some embodiments, potential spots to be visited by the aerial drone (such spots are also referred to herein as "candidate locations") may be based on model forecast and/or data mined locations considered hazardous. Model-forecast locations considered hazardous may be obtained by, for example, a prediction model such as the FASST model. Using both meteorological and terrain data, FASST may be used to calculate a road's moisture content, ice content, temperature, and freeze/thaw profiles, as well as soil strength and surface ice and snow accumulation/depletion. Mined-data locations considered hazardous may be obtained by, for example, accessing one or more vehicle accident history databases typically maintained by auto insurance companies and government entities (e.g., various state, county, and/or local Department of Transportation (DOT) entities).

In accordance with some embodiments, one or more predictive models may be used to obtain model-forecast locations considered hazardous. Suitable predictive models include, but are not limited to, FASST, Pooled Fund Study Maintenance Decision Support System (PFS MDSS), Iteris' Highway Conditions Analysis Prediction System (Hi-CAPS™) pavement condition model (Iteris, Inc. based in Santa Ana, Calif.), and the like. In accordance with some embodiments, one or more predictive models may receive meteorological and terrain data including, but not limited to, precipitation type, precipitation amount, air temperature, dew point temperature (or RH), wind direction, wind speed, solar radiation flux, net radiation balance, time of plowing, time of material treatment, material application rate, type of material being applied, surface character of surrounding snow, depth of snow in fields surrounding highway, and the like. In accordance with some embodiments, one or more predictive models may routinely receive, on a dynamic basis, meteorological and terrain data associated with one or more points along a segment of roadway. Based on this input meteorological and terrain data, the one or more predictive models generates, for one or more locations, a forecast road surface condition and a forecast road surface temperature.

In accordance with some embodiments, one or more vehicle accident history databases may be mined to obtain mined-data locations considered hazardous. Preferably, the one or more vehicle accident history databases each includes meteorological data for each vehicle accident—the meteorological data may then be matched against the meteorological data used in the model forecast so that only vehicle accidents that occurred during meteorological conditions similar to those used in the model forecast are included among the mined-data locations considered hazardous. For example, mined-data locations considered hazardous may be obtained in accordance with some embodiments using one or more vehicle accident history databases each of which includes meteorological data for each vehicle accident to identify, through data analytics, locations prone to vehicle accidents during specific meteorological conditions.

In accordance with some embodiments, the candidate locations may be determined based on a subset of intersection between the set of model-forecast locations considered hazardous and the set of mined-data locations considered hazardous.

The flight path of an aerial drone is optimized, in accordance with some embodiments, after producing one or more candidate locations from a model forecast and/or data-mined locations considered hazardous. Sensor packages for detecting dangerous conditions (e.g., ice or pooled water) may be heavy and aerial drones have only limited fly time. With a list of candidate condition locations produced from a model forecast and/or data-mined locations considered hazardous, effective use of the aerial drone's limited fly time becomes an optimization problem, or "traveling salesman" challenge. For example, the flight path of the drone may be optimized to assess as many spots (preferably, those with the highest priority) as possible in one go. Myriad approaches to the traveling salesman problem (TSP) are well known in the art.

In accordance with some embodiments, if the aerial drone confirms a dangerous condition (e.g., ice or pooled water) and has completed its TSP route, the aerial drone may hover and flash a warning light for incoming motorists. In accordance with some embodiments, the aerial drone may alert local authorities to, for example, adjust down nearby digital road speed limit signs and/or place caution messages on signage.

In accordance with some embodiments, decisions (e.g., flight path optimization, model calibration, and/or action taken if the aerial drone confirms a dangerous condition) may be made onboard the aerial drone from observations, forecasts, and mined data with a range of optimized outcomes. In other embodiments, these decisions may be made, at least partially, remotely by one or more server devices (e.g., a central server) in communication with the aerial drone.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA)

bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
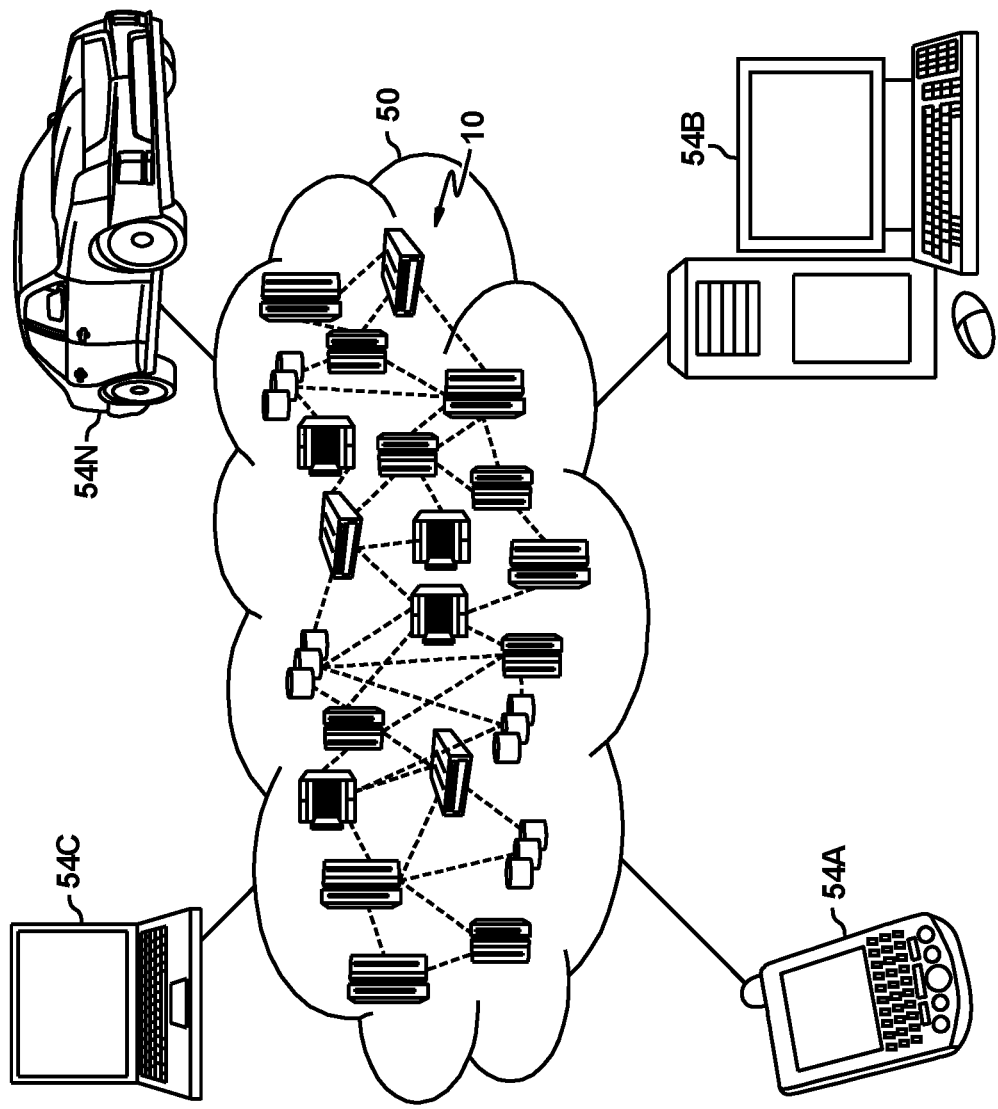
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
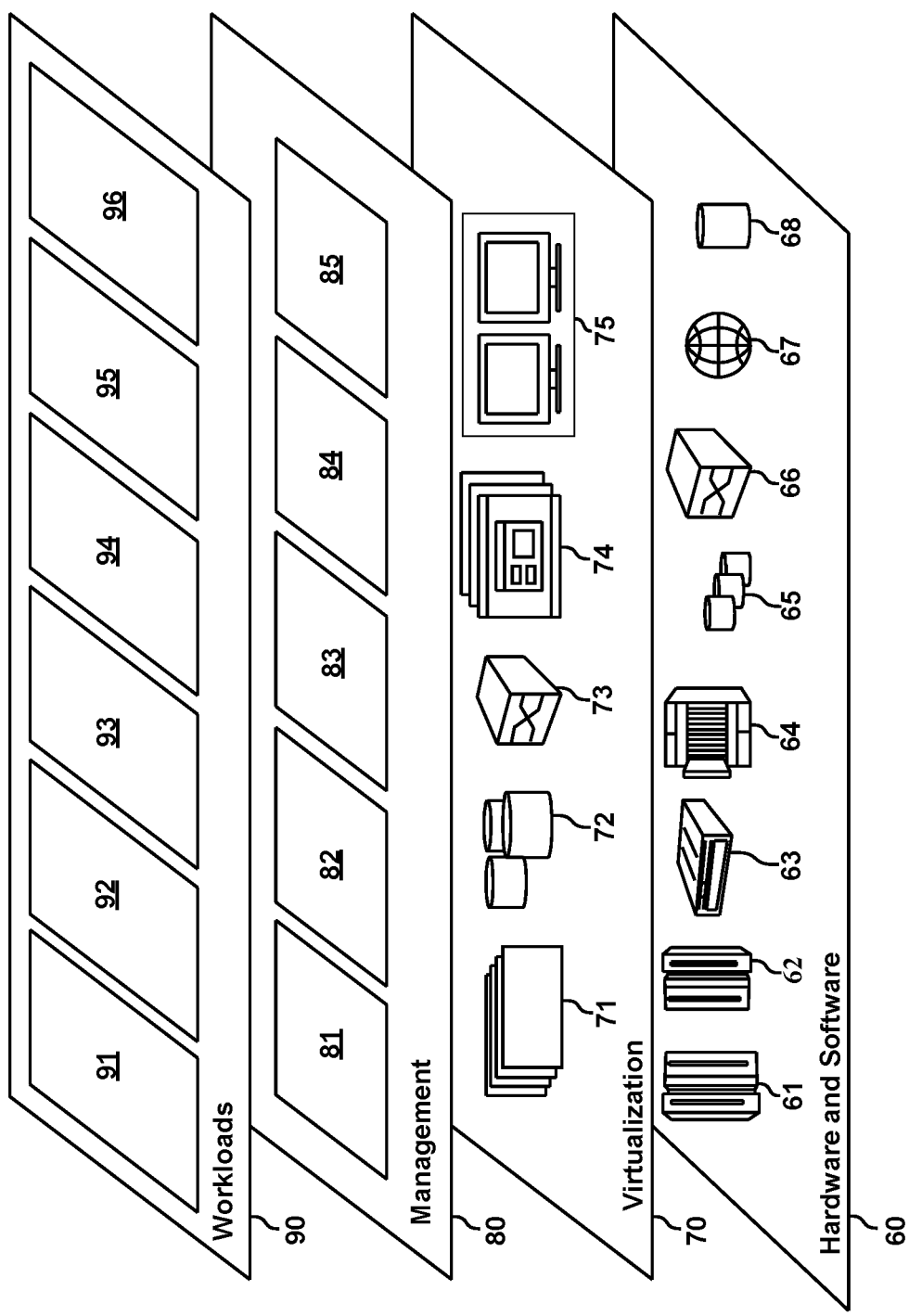
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and road surface condition assessment 96.

Figure 4:
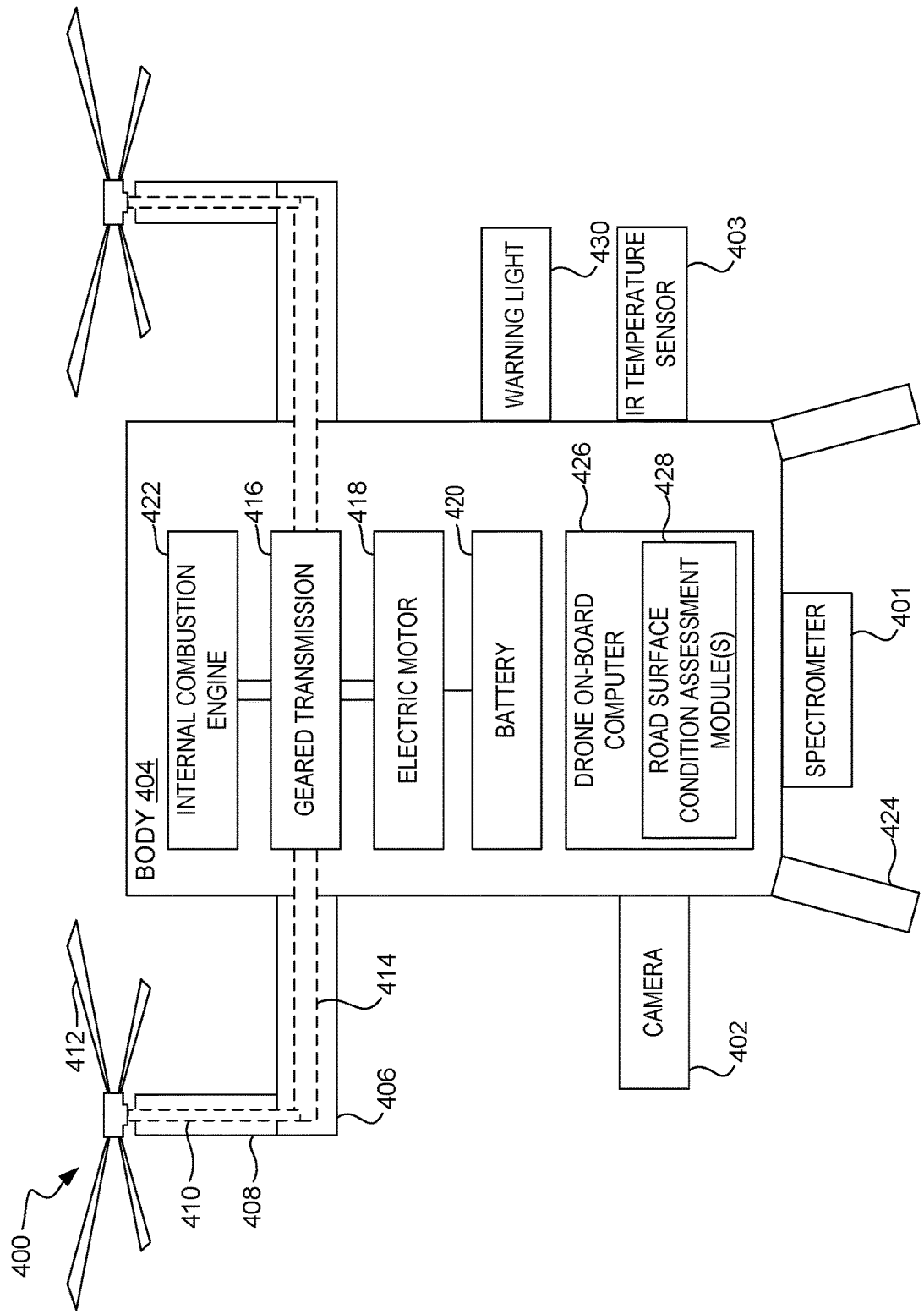
FIG. 4 depicts an exemplary aerial drone with a sensor for assessing road surface condition, according to one or more embodiments.

With reference now to FIG. 4, an exemplary aerial drone 400 with one or more sensors (e.g., a spectrometer 401, a camera 402, an infrared temperature sensor 403, etc.) for assessing road surface condition is depicted in accordance with one or more embodiments. The terms "aerial drone", "drone", and unmanned aerial vehicle" ("UAV") are used interchangeably herein to identify and describe an airborne vehicle that is capable of pilotless flight.

The spectrometer 401 may be, for example, an ASD FieldSpec® 4 Hi-Res high resolution spectroradiometer mounted on the aerial drone 400 and configured to collect data at a suitable altitude. A suitable altitude may be, for example, 30-50 m above the road surface being assessed. One skilled in the art will appreciate that the aerial drone 400 must operate under a maximum allowable altitude.

The spectrometer 401 measures light reflected from a road surface at one or more wavelengths, typically in the near infrared (NIR) and short-wavelength infrared (SWIR) spectra. If the aerial drone 400 is deployed during daylight, either solar illumination or artificial illumination may be used as the light source. If the aerial drone 400 is deployed at night, artificial illumination may be used as the light source to artificially create daylight conditions. An example of a suitable artificial light source is a tungsten quartz halogen lamp (511 in FIG. 5). Optionally, a filter that only allows emission of IR light may be used. Another example of a suitable artificial light source is one or more laser diodes, each with a different wavelength in the NIR and/or SWIR spectra.

In accordance with some embodiments, the spectrometer 401 may be used alone (i.e., without other sensors) to assess road surface condition. In accordance with other embodiments, the spectrometer 401 may be used to assess road surface condition in conjunction with a camera 402 (e.g., a RGB camera equipped with a standard CMOS sensor through which color images are acquired) mounted on the aerial drone 400 and configured to obtain visual images (i.e., digital still and/or moving pictures) of road surfaces and/or an infrared temperature sensor 403 (e.g., long wavelength infrared) mounted on the aerial drone 400 and configured to measure the temperature on road surfaces.

The spectrometer 401, the camera 402, and the infrared temperature sensor 403 each may be communicatively coupled to and operate under the control of the drone on-board computer 426. For example, operation of the spectrometer 401, the camera 402, and/or the infrared temperature sensor 403 may be controlled by the drone on-board computer 426 utilizing one or more of a set (at least one) of road surface condition assessment modules 428.

As shown in FIG. 4, aerial drone 400 includes a body 404, which may be attached to supports such as support 406. Supports such as support 406 may support stanchions such as stanchion 408. Such stanchions may provide a housing for a drive shaft within each of the stanchions, such as the depicted driveshaft 410 within stanchion 408. These driveshafts may be connected to propellers. For example, driveshaft 410 within stanchion 408 may be connected to a propeller 412.

A power transfer mechanism 414 (e.g., a chain, a primary drive shaft, etc.) may transfer power from a geared transmission 416 to the driveshafts within the stanchions (e.g., from geared transmission 416 to the driveshaft 410 within stanchion 408), such that propeller 412 is turned, thus providing lift and steering to the aerial drone 400. Geared transmission 416 may contain a plurality of gears, such that a gear ratio inside geared transmission 416 can be selectively changed.

Power to the geared transmission 416 may be selectively provided by an electric motor 418 (which is supplied with electrical power by a battery 420) or an internal combustion engine 422, which burns fuel from a fuel tank (not shown). In some embodiments, the internal combustion engine 422 may have greater power than the electric motor, since internal combustion engines are typically able to produce greater torque/power and have greater range (can fly farther) than electric motors of the same size/weight.

Affixed to body 404 may be landing gear such as legs 422 that may support the aerial drone 400 during liftoff and landing.

Also affixed to body 404 may be a warning light 430 for warning oncoming vehicles of a dangerous road surface condition. For example, the warning light 430 may be in the form of a series of flashing LEDs arranged in a triangular warning sign. The warning light 430 may operate under the control of the drone on-board computer 426. For example, operation of the warning light 430 may be controlled by the drone on-board computer 426 utilizing one or more of a set (at least one) of road surface condition assessment modules 428.

Figure 5:
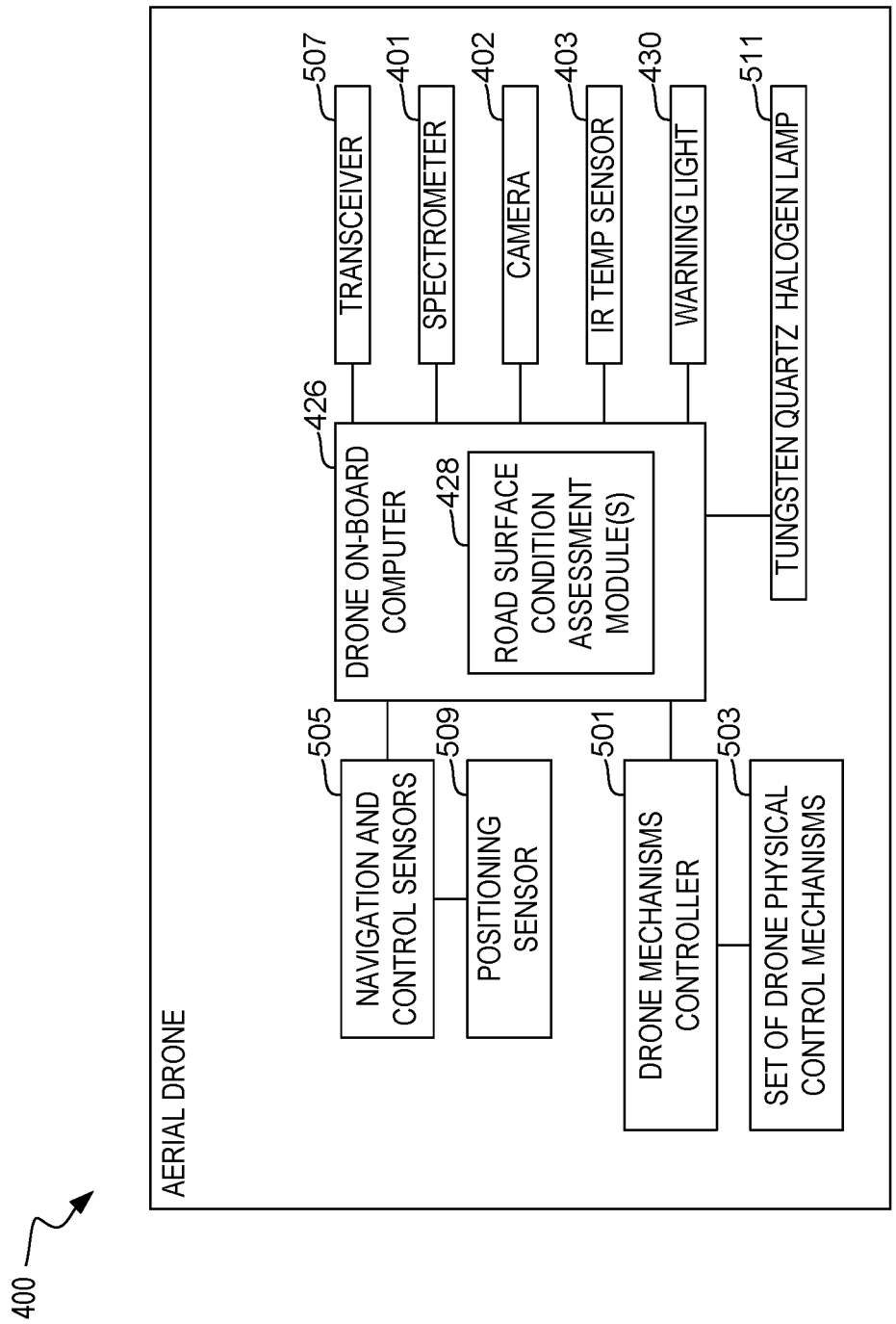
FIG. 5 illustrates additional detail of the exemplary aerial drone shown in FIG. 4, according to one or more embodiments.

With reference now to FIG. 5, additional detail of the exemplary aerial drone 400 shown in FIG. 4 is illustrated in accordance with one or more embodiments.

The drone on-board computer 426 may control a drone mechanisms controller 501, which is a computing device that controls a set (at least one) of drone physical control mechanisms 503. The set of drone physical control mechanisms 503 may include, but is not limited to, throttles for internal combustion engine 422 and/or electric motor 418, selectors for selecting gear ratios within the geared transmission 416, controls for adjusting the pitch, roll, and angle of attack of propellers such as propeller 412, and other controls used to control the operation and movement of the aerial drone 400.

Whether in autonomous mode or remotely-piloted mode, the drone on-board computer 426 controls the operation of aerial drone 400. This control includes the use of outputs from navigation and control sensors 505 to control the aerial drone 400. Navigation and control sensors 505 may include hardware sensors that: (1) determine the location of the aerial drone 400; (2) sense other aerial drones and/or obstacles and/or physical structures around the aerial drone 400; (3) measure the speed and direction of the aerial drone 400; and (4) provide any other inputs needed to safely control the movement of the aerial drone 400.

With respect to the feature of (1) determining the location of the aerial drone 400, this may be achieved in one or more embodiments through the use of a positioning system (not shown), which may be part of the drone on-board computer 426, combined with positioning sensor 509 (e.g., accelerometers, global positioning system (GPS) sensors, altimeters, etc.). That is, the positioning system may use a global positioning system (GPS), which uses space-based satellites that provide positioning signals that are triangulated by a GPS receiver to determine a 3-dimensional geophysical position of the aerial drone 400. The positioning system may also use, either alone or in conjunction with a GPS system, physical movement sensors (i.e., positioning sensor 509) such as accelerometers (which measure changes in direction and/or speed by an aerial drone in any direction in any of three dimensions), speedometers (which measure the instantaneous speed of an aerial drone), airflow meters (which measure the flow of air around an aerial drone), barometers (which measure altitude changes by an aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 400, the drone on-board computer 426 may utilize radar or other electromagnetic energy that is emitted from an electromagnetic radiation transmitter (e.g., transceiver 507 shown in FIG. 5), bounced off a physical structure (e.g., a building, bridge, or another aerial drone), and then received by an electromagnetic radiation receiver (e.g., transceiver 507). By measuring the time it takes to receive back the emitted electromagnetic radiation, and/or evaluating a Doppler shift (i.e., a change in frequency to the electromagnetic radiation that is caused by the relative movement of the aerial drone 400 to objects being interrogated by the electromagnetic radiation) in the received electromagnetic radiation from when it was transmitted, the presence and location of other physical objects can be ascertained by the drone on-board computer 426.

With respect to the feature of (3) measuring the speed and direction of the aerial drone 400, this is accomplished in one or more embodiments by taking readings from an on-board airspeed indicator (not shown) on the aerial drone 400 and/or detecting movements to control mechanisms (e.g., one or more of the set of drone physical control mechanisms 503) on the aerial drone 400 and/or the positioning system, discussed above.

With respect to the feature of (4) proving any other inputs needed to safely control the movement of the aerial drone 400, such inputs may include, but are not limited to, control signals to direct the aerial drone 400 to make an emergency landing, etc.

Also on aerial drone 400 in one or more embodiments is the spectrometer 401, which is capable of sending spectroscopy data to the drone on-board computer 426 for analysis by one or more of the set of road surface condition assessment modules 428. The spectrometer 401 measures light reflected from a road surface at one or more wavelengths, typically in the near infrared (NIR) and short-wavelength infrared (SWIR) spectra.

Also on aerial drone 400 in one or more embodiments is the camera 402, which is capable of sending still or moving visible light digital photographic images (and/or infrared light digital photographic images) to the drone on-board computer 426. These images may be used to determine the location of the aerial drone 400 (e.g., by matching to known landmarks), to sense other drones/obstacles, and/or to determine speed (by tracking changes to images passing by) of the aerial drone 400. These images may also be sent to the drone on-board computer 426, in conjunction with spectroscopy data obtained by spectrometer 401, for analysis by one or more of the set of road surface condition assessment modules 428.

Also on aerial drone 400 in one or more embodiments is the infrared temperature sensor 403, which is capable of sending temperature data to the drone on-board computer 426. This temperature data may be sent to the drone on-board computer 426, in conjunction with spectroscopy data obtained by spectrometer 401, for analysis by one or more of the set of road surface condition assessment modules 428.

Also on aerial drone 400 in one or more embodiments may be one or more additional sensors (not shown). Examples of such additional sensors may include, but are not limited to, air pressure gauges, microphones, barometers, chemical sensors, vibration sensors, etc., which detect real-time operational conditions of aerial drone 400 and/or an environment around aerial drone 400. Another example of an additional sensor is a light sensor, which is able to detect light from other drones, street lights, home lights, etc., in order to ascertain the environment in which the aerial drone 400 is operating.

Also on aerial drone 400 in one or more embodiments is the warning light 430. The warning light 430 is activated by drone on-board computer 426 to provide visual warning to oncoming vehicles of a dangerous road surface condition.

Also on aerial drone 400 in one or more embodiments is a transceiver 507 communicatively coupled to and operated under the control of the drone on-board computer 426. The transceiver 507 may be used by the drone on-board computer 426 to communicate with one or more server devices (e.g. a central server), one or more databases, one or more other aerial drones, one or more vehicles, and/or one or more road signs.

Also on aerial drone 400 in one or more embodiments is a tungsten quartz halogen lamp 511 to provide artificial illumination to the road surface. If the aerial drone 400 is deployed at night, for example, the tungsten quartz halogen lamp 511 may be activated by drone on-board computer 426 to artificially create daylight conditions. Optionally, a filter that only allows emission of IR light may be used in conjunction with the tungsten quartz halogen lamp 511.

Figure 6A:
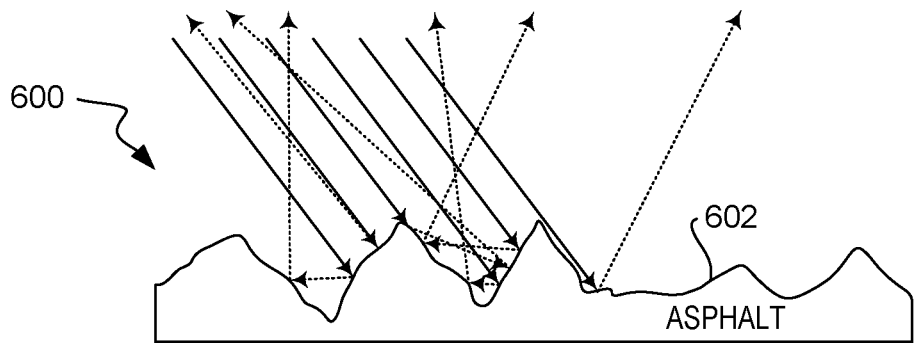
FIG. 6A illustrates diffuse reflection of an asphalt surface, according to one or more embodiments.
Figure 6B:
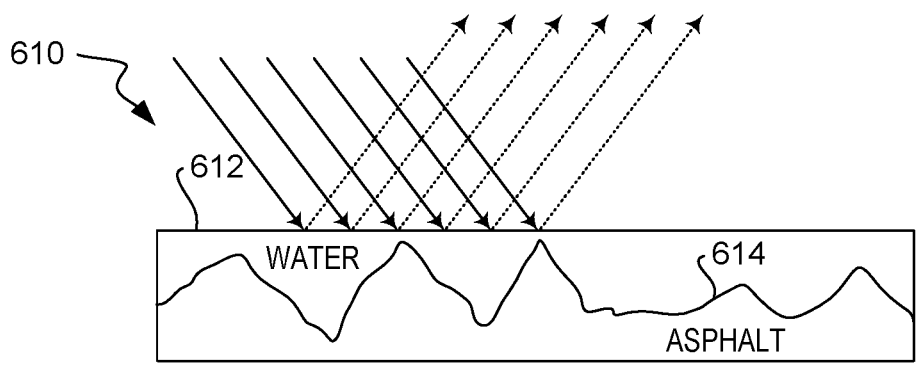
FIG. 6B illustrates specular reflection of a water layer covering an asphalt surface, according to one or more embodiments.

Asphalt, water on asphalt, snow on asphalt, and ice on asphalt have different physical forms that influence how the surface reflects light. With respect to reflection, there are two extremes: specular and diffuse. Referring now to FIG. 6A, diffuse reflection 600 of an asphalt surface 602 is illustrated in accordance with one or more embodiments. Referring now to FIG. 6B, specular reflection 610 of a water layer 612 covering an asphalt surface 614 is illustrated in accordance with one or more embodiments.

Figure 6C:
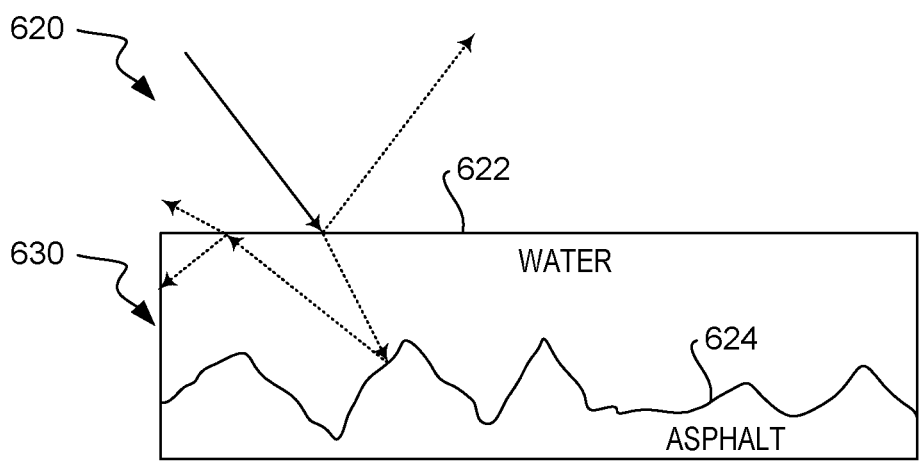
FIG. 6C illustrates specular reflection of a water layer covering an asphalt surface and reflection-refraction interaction within the water layer, according to one or more embodiments.

Depending on the phase (water, snow, ice) of the layer covering asphalt and the angle of the incoming light, some of the light is reflected at the top surface of the layer covering the asphalt and some of the light is refracted into the layer and then reflected at the top surface of the asphalt. Referring now to FIG. 6C, specular reflection 620 of a water layer 622 covering an asphalt surface 624 and reflection-refraction interaction 630 within the water layer 622 is illustrated in accordance with one or more embodiments. In addition, although not shown in FIG. 6C, as the light travels through the layer covering the asphalt, some of the light is absorbed and/or scattered to varying degrees depending on the phase of the layer.

The different reflections for asphalt, and water, snow, and ice on asphalt can be used for classification of road surface condition. Similarly, roadway materials other than asphalt (e.g., concrete), and water, snow, and ice thereon exhibit different reflections that can be used for classification of road surface condition. A myriad of conventional sensors exploit these different reflections to assess of road surface condition. Some of these conventional sensors also exploit the fact that light is polarized by a water layer covering asphalt. One example of such a convention sensor utilizes a camera combined with image processing. Another example of such a conventional sensor utilizes pyrometers to measure the ratio of incoming and reflected light (albedo). Yet another example of such a conventional sensor utilizes polarized light to determine the thickness of water-ice films. In accordance with some embodiments, an aerial drone may be equipped with such a conventional sensor for assessing road surface condition.

Figure 7:
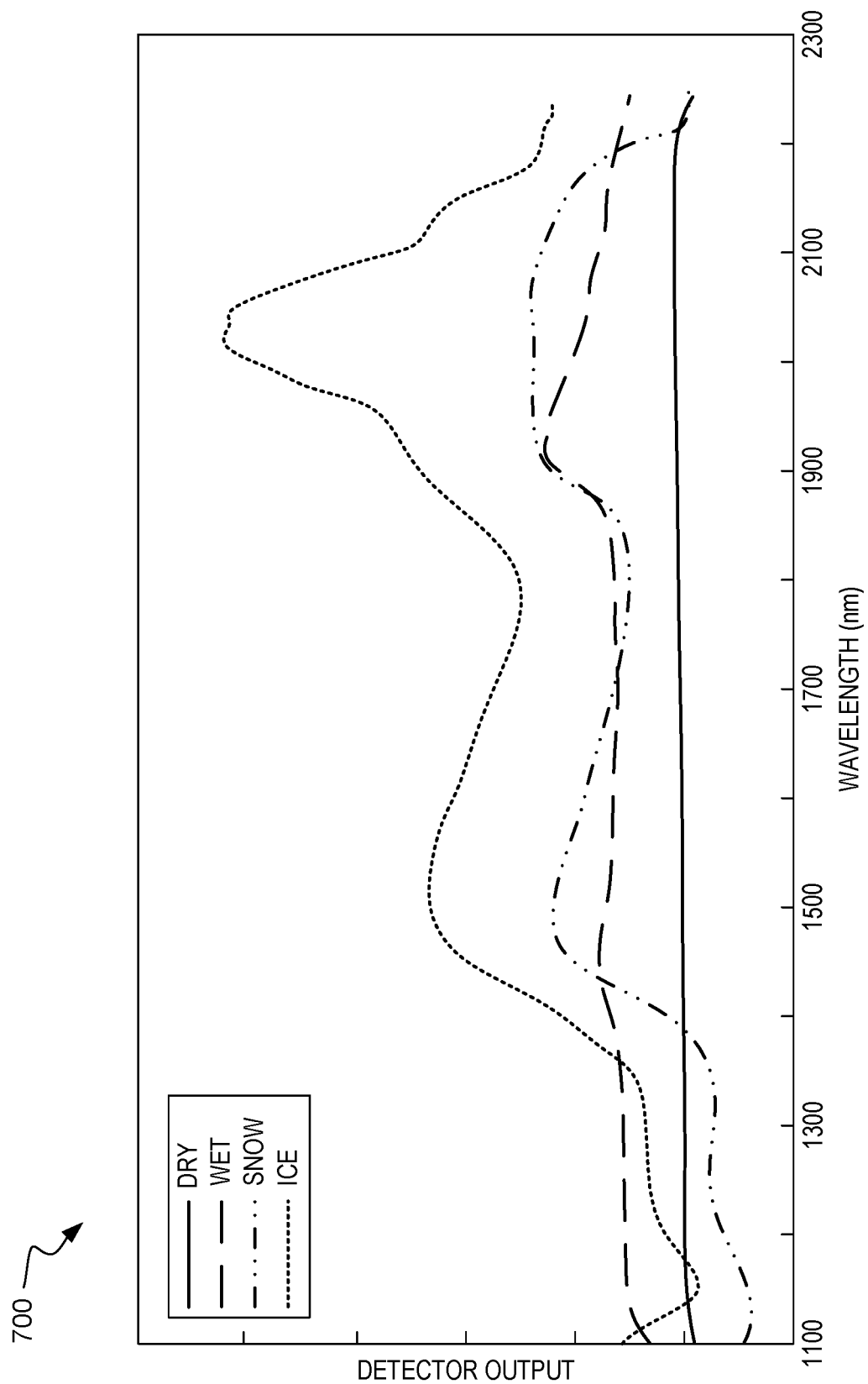
FIG. 7 illustrates an exemplary plot of detector output versus wavelength for various road surface conditions (i.e., dry, wet, snow, and ice), according to one or more embodiments.

The near infrared wavelength spectrum of asphalt, and water, ice, and snow on the asphalt are distinguishable from each other. FIG. 7 is an exemplary plot 700 of detector output versus wavelength for various road surface conditions (i.e., dry, wet, snow, and ice) in accordance with one or more embodiments.

One or more portions of the detector output plotted in FIG. 7 may be, for example, obtained by an ASD Field-Spec® 4 Hi-Res high resolution spectroradiometer mounted on an aerial drone (e.g., the spectrometer 401 mounted on the aerial drone 400 in FIG. 4) and configured to collect data at one or more wavelengths while flying (and/or hovering) at a suitable altitude (e.g., 30-50 m) over a road surface. The aerial drone may fly (and/or hover) directly over the road surface being assessed or adjacent thereto. Preferably, the one or more wavelengths at which the spectrometer collects data is/are selected to provide detector output that readily distinguishes the various road surface conditions from each other. For example, with reference to FIG. 7, the spectrometer may be configured to collect data at three wavelengths: 1300 nm, 1500 nm, and 2050 nm.

Figure 8:
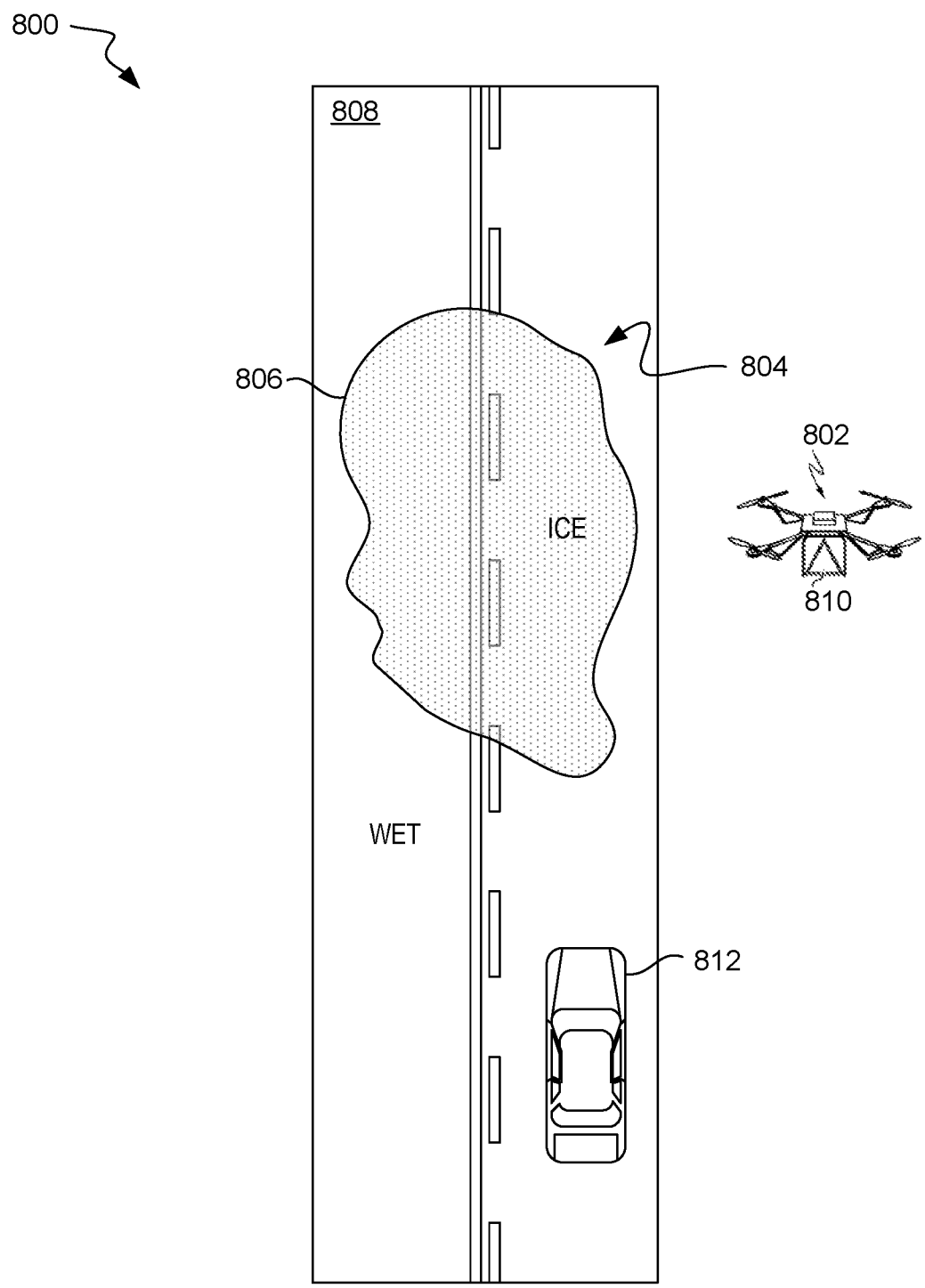
FIG. 8 illustrates an exemplary observation site, according to one or more embodiments.

With reference now to FIG. 8, an exemplary observation site 800 is illustrated in accordance with one or more embodiments. At the exemplary observation site 800, a sensor-equipped aerial drone 802 performs an exemplary assessment of road surface condition. In the exemplary assessment illustrated in FIG. 8, the sensor-equipped aerial drone 802 has classified the observation site 800 as containing a dangerous road surface condition 804 (e.g., a patch of ice 806 on the road surface 808). More generally, in accordance with one or more embodiments, the sensor-equipped aerial drone 802 may classify the observation site 800 as containing one or more road surface conditions (e.g., dry, wet, ice, and snow). The sensor-equipped aerial drone 802 may, for example, collect spectral data at one or more wavelengths while flying (and/or hovering) over the observation site 800 (e.g., using the spectrometer 401 in FIG. 4) and, as in the exemplary assessment illustrated in FIG. 8, classify (e.g., using the drone on-board computer 426 in FIG. 4) a portion of the road surface 808 at the observation site 800 as ice-covered (i.e., denoted as "ice" in FIG. 8) and the remainder of the road surface 808 at the observation site 800 as water-covered (i.e., denoted as "wet" in FIG. 8). Having assessed the road surface 808 at the observation site 800 as containing dangerous road surface condition 804, the sensor-equipped aerial drone 802 may, in accordance with one or more embodiments, hover over the observation site 800 and flash a warning light 810 to warn approaching vehicles, such as automobile 812, of the dangerous road surface condition 804.

Figure 9:
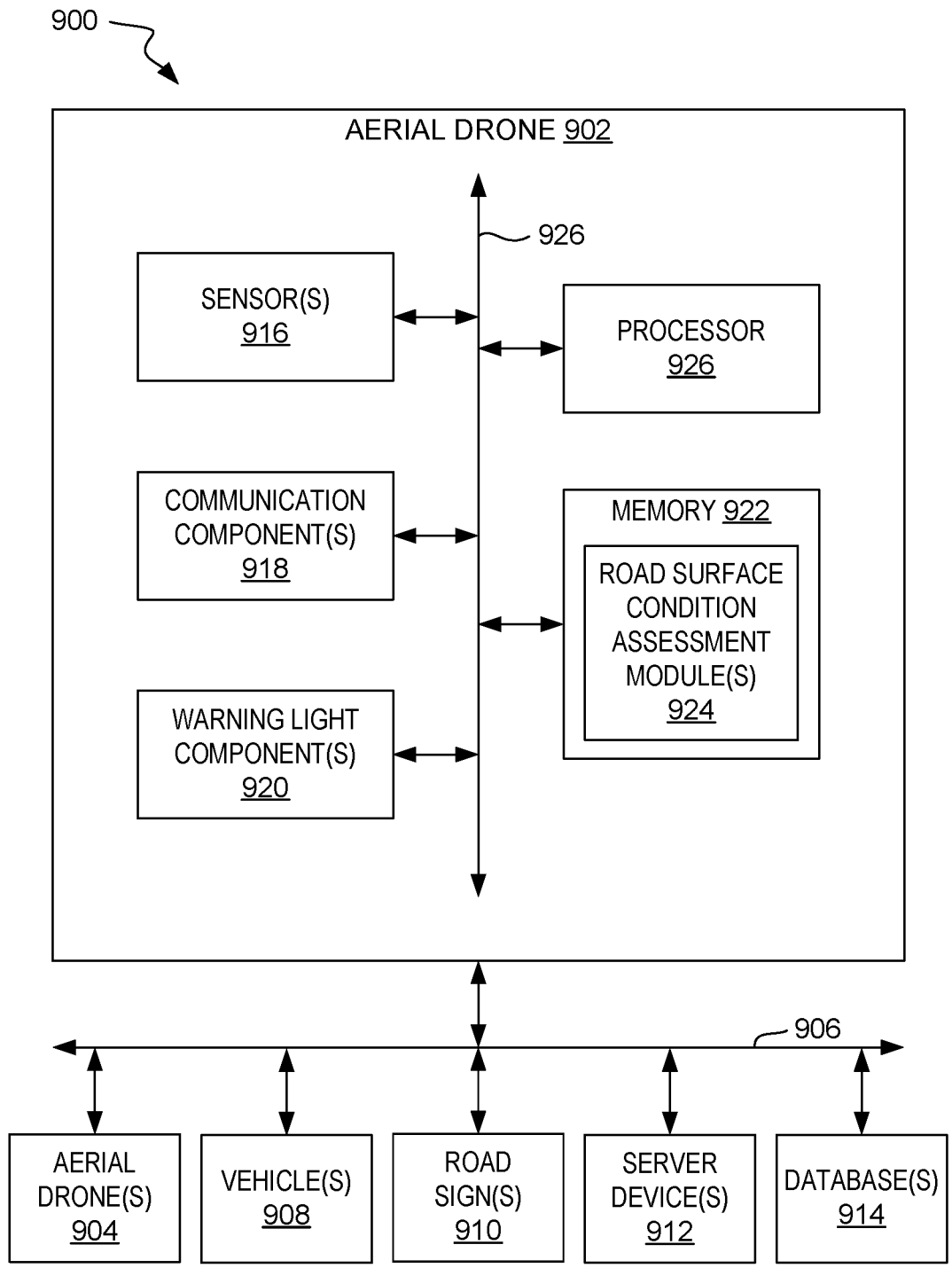
FIG. 9 illustrates a block diagram of an example, non-limiting system that facilitates road surface condition assessment, according to one or more embodiments.

Referring now to FIG. 9, a block diagram of an example, non-limiting system 900 that facilitates road surface condition assessment is illustrated in accordance with one or more embodiments. Repetitive description of like elements employed in other embodiments described herein is omitted for the sake of brevity. Aspects of systems (e.g., system 900 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 9, the system 900 may include one or more aerial drones 902, 904, one or more networks 906, one or more vehicles 908, one or more road sign(s) 910, one or more server devices 912, and one or more databases 914. It is to be appreciated that the one or more aerial drones 902, 904, the one or more vehicles 908, the one or more road signs 910, the one or more server devices 912, and the one or more databases 914 may be equipped with communication devices (e.g., one or more communication components 918, described below, with respect to aerial drone 902) that enable communication between the one or more aerial drones 902, 904, the one or more vehicles 908, the one or more road signs 910, the one or more server devices 912, and the one or more databases 914 over the one or more networks 906.

Aerial drones 902, 904 may include the structure and/or functionality of one or more aerial drones 400 in FIGS. 4 and 5, one or more sensor-equipped aerial drone 802 in FIG. 8, and/or any other structure and/or functionality described herein for aerial drones. Aerial drone 904 may be a different type of aerial drone than aerial drone 902. Aerial drone 904 may also be an aerial drone 902 and/or include one or more components of aerial drone 902. It is to be appreciated that in discussions below where more than one aerial drone is employed, the aerial drones may include one or more aerial drones 902 and/or one or more aerial drone 904.

The one or more vehicles 908 may include any vehicle disclosed herein, as well as any system associated therewith (e.g., a vehicle's navigation system, a snow plow's dispatch system, and the like). For example, the one or more vehicles 908 may include a vehicle approaching a dangerous road surface condition (e.g., vehicle 812 in FIG. 8), a snow plow dispatched to a dangerous road surface condition, and the like. In one or more embodiments, in response to aerial drone 902 determining that an observation site includes a dangerous road surface condition, a vehicle's navigation system may receive information from a central server (e.g., one or more server devices 912) that the dangerous road surface condition lies ahead on a planned route and offer the driver an option to select an alternative route that does not contain a dangerous road surface condition. In one or more embodiments, in response to aerial drone 902 determining that an observation site includes a dangerous road surface condition, a snow plow's dispatch system may receive information from a central dispatcher (e.g., one or more server devices 912) dispatching the snow plow to the dangerous road surface condition and the snow plow's dispatch system may display the dangerous road surface condition on a map interface as color coded lines.

The one or more road signs 910 may include any road sign disclosed herein. For example, the one or more road signs 910 may include a digital speed limit sign, electronically programmable signage, and the like. For example, in response to aerial drone 902 determining that an observation site includes a dangerous road surface condition, a central server (e.g., one or more server devices 912) may adjust down the speed limit on a digital speed limit sign located near the dangerous road surface condition. In another example, in response to aerial drone 902 determining that an observation site includes a dangerous road surface condition, a central server (e.g., one or more server devices 912) may place a caution message on electronically programmable signage located near the dangerous road surface condition.

The one or more server devices 912 may be any computing device that can communicatively couple to aerial drone 902, non-limiting examples of which include a server computer, a computer, a mobile computer, a control system, a central server, a central dispatcher, a road weather information system (RWIS) server, a collision avoidance system, a weather computer, an emergency system, a communication system, a warning system, a radar system, a traffic system, and/or any other suitable computing device.

The one or more databases 914 may be any database, non-limiting examples of which include a weather database, a vehicle accident history database, and/or any other suitable database. Vehicle accident history databases are typically maintained by auto insurance companies and government entities (e.g., various state, county, and/or local Department of Transportation (DOT) entities).

The various components (e.g., aerial drones 902, 904, vehicles 908, road signs 910, server devices 912, databases 914, sensors 916, communication components 918, warning light components 920, memory 922, processor 926, and/or other components) of system 900 may be connected directly or via one or more networks 906. Such networks 906 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Mal, WLAN, radio communication, microwave communication, satellite communication, optical communication, sonic communication, electromagnetic induction communication, and/or any other suitable communication technology.

In some embodiments, aerial drone 902 may include one or more sensors 916, which may be sensors as discussed herein. For example, the one or more sensors 916 may correspond to spectrometer 401, camera 402, and infrared temperature sensor 403 in FIGS. 4 and 5.

Aerial drone 902 may include one or more communication components 918 that enable aerial drone 902 to communicate with one or more other aerial drones 904, one or more vehicles 908, one or more road signs 910, one or more server devices 912, and/or one or more databases 914 over one or more networks 906 via wireless and/or wired communications. For example, the one or more communication components 918 may correspond to transceiver 507 in FIG. 5.

Aerial drone 902 may include one or more warning light components 920 that may provide visual warning to oncoming vehicles (e.g., vehicle 812 in FIG. 8) of a dangerous road surface condition. For example, the one or more warning light components 920 may correspond to warning light 430 in FIGS. 4 and 5 and warning light 810 in FIG. 8.

Aerial drone 902 may include or otherwise be associated with at least one memory 922 that may store computer executable program module(s) (e.g., computer executable program module(s) may include, but are not limited to, road surface condition assessment module(s) 924 and associated program module(s)). Road surface condition assessment module(s) 924 may correspond to program modules 42 in FIG. 1 and road surface condition module(s) 428 in FIGS. 4 and 5. Aerial drone 902 may also include or otherwise be associated with at least one processor 926 that executes the computer executable program module(s) stored in the memory 922. Aerial drone 902 may further include a system bus 926 that may couple the various components including, but not limited to, sensor(s) 916, communication component(s) 918, warning light component(s) 920, memory 922, processor 926, and/or other components.

While the aerial drone 902 is shown in FIG. 9 as including road surface condition assessment module(s) 924, in other embodiments, any number of different types of devices may be associated with or include all or some of the road surface condition assessment module(s) 924. For example, one or more server devices 912 may include all or some of the road surface condition assessment module(s) 924. In other words, data processing associated with road surface condition assessment may be performed locally (e.g., using the processor 926, the drone on-board computer 426 in FIGS. 4 and 5, and the like) and/or remotely (e.g., at one or more server devices 912, such as a central server, using the processing unit 16 in FIG. 1). All such embodiments are envisaged.

For example, determination of one or more candidate locations and/or optimization of the flight path for the aerial drone 902 may be locally performed (e.g., using the processor 926, drone on-board computer 426 in FIG. 4, and the like) and/or remotely performed (e.g., at one or more server devices 912, such as a central server, using the processing unit 16 in FIG. 1). In accordance with some embodiments, the determination of one or more candidate locations and optimization of the flight path for the aerial drone 902 may be remotely performed at one or more server devices 912, such as a central server, based on a model forecast and/or mined-data obtained by accessing one or more databases 914 through the network 906. At least a portion of the optimized flight path may then be transmitted from the one or more server devices 912, such as a central server, to the aerial drone 902. In accordance with other embodiments, the determination of one or more candidate locations and optimization of the flight path for the aerial drone 904 may be locally performed onboard the aerial drone 902 based on a model forecast and/or mined-data obtained by accessing one or more databases 914 through the network 906.

Also, spectral data collected by the aerial drone 902 (e.g., using one or more sensors 916, the spectrometer 401 in FIG. 4, and the like) while flying (and/or hovering) over an observation site (e.g., 800 in FIG. 8) may be locally processed (e.g., using the processor 926, the drone on-board computer 426 in FIG. 4, and the like) and/or remotely processed (e.g., at one or more server devices 912, such as a central server, using the processing unit 16 in FIG. 1) to classify the observation site as containing one or more road surface conditions (e.g., dry, wet, ice, and snow) and/or determine if the observation site contains a dangerous road surface condition (e.g., a potentially hazardous deposit of rain, snow, and/or ice). The determination of the presence of a dangerous road surface condition may be reported to one or more aerial drones 904, one or more vehicles 908, one or more road signs 910, one or more server devices 912, and/or one or more databases 914. For example, the aerial drone 902 may report its "on-board" determination of the presence of a dangerous road surface condition to a central server through the network 906. Additionally, the central server may, in turn, report the determination of the presence of a dangerous road surface condition to one or more aerial drones 904, one or more vehicles 908, one or more road signs 910, one or more server devices 912, and/or one or more databases 914, through the network 906.

Figure 10:
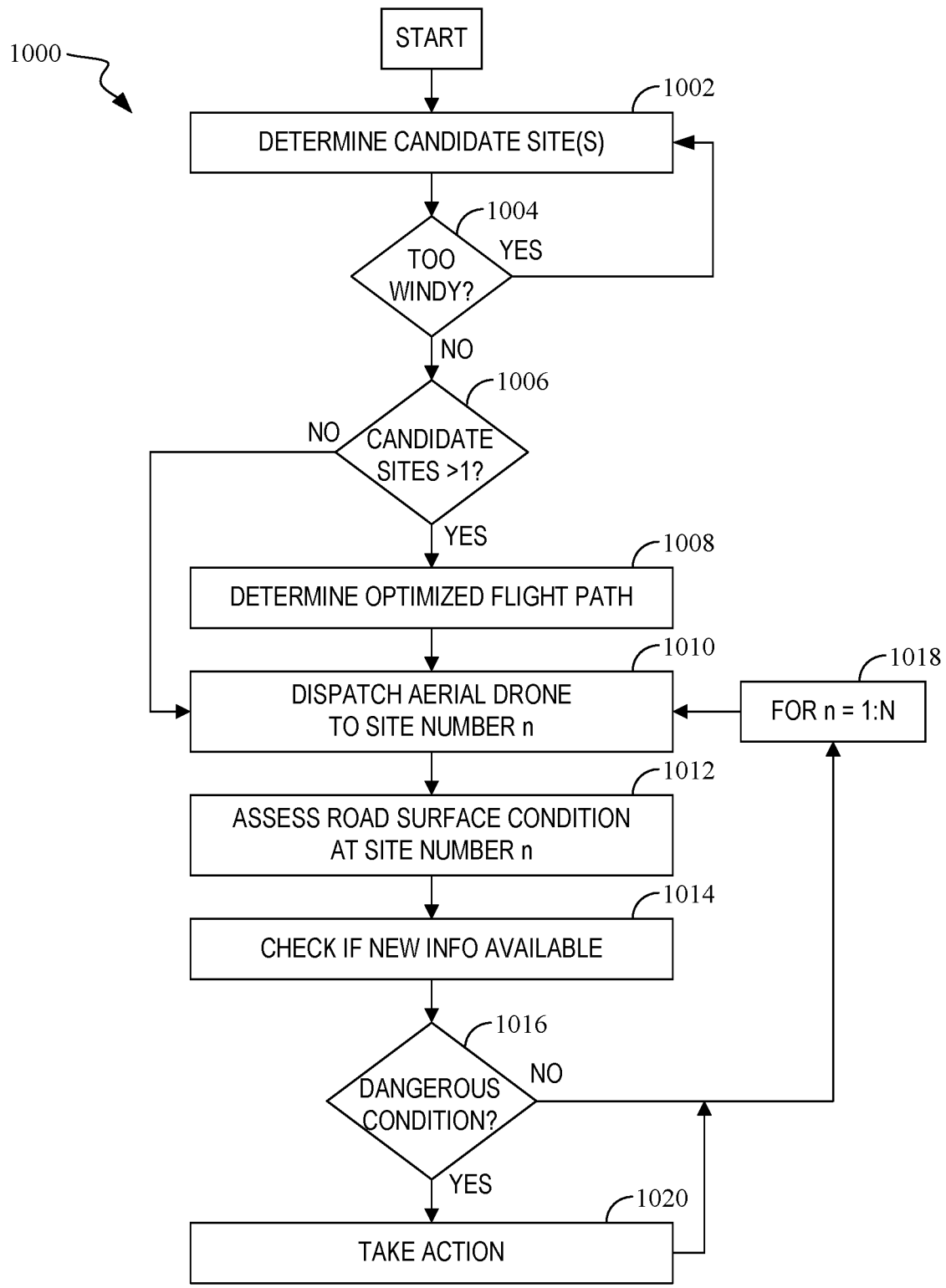
FIG. 10 is a flow diagram of an illustrative method for assessing road surface condition using an aerial drone, according to one or more embodiments.

Referring now to FIG. 10, a flow diagram of an illustrative method 1000 for assessing road surface condition using an aerial drone is illustrated in accordance with one or more embodiments. The method 1000 sets forth the preferred order of the blocks. It must be understood, however, that the various blocks may occur at any time relative to one another.

The method 1000 begins by determining one or more candidate locations each forecast to have a dangerous road surface condition (block 1002). For example, the one or more candidate locations may be determined by utilizing one or more prediction models and/or mining one or more databases. Model-forecast locations considered hazardous may be obtained by, for example, a prediction model such as the FASST model. Mined-data locations considered hazardous may be obtained by, for example, accessing one or more vehicle accident history databases typically maintained by auto insurance companies and government entities (e.g., various state, county, and/or local Department of Transportation (DOT) entities). The one or more candidate locations may be determined locally at the aerial drone and/or remotely (e.g., at a central server).

The method 1000 continues by determining whether wind conditions do not allow the aerial drone to fly safely (block 1004). For example, this determination may be based wind speed data (e.g., predicted and/or observed) obtained by accessing a weather database. Preferably, the wind speed data are obtained for one or more locations at or near the one or more candidate locations. The wind speed data obtained may be compared against the maximum wind speed rating of the aerial drone and/or the maximum speed of the aerial drone. The determination of whether wind conditions do not allow the aerial drone to fly safely may be made locally at the aerial drone and/or remotely (e.g., at a central server).

In response to determining that wind conditions do not allow the aerial drone to fly safely (block 1004=YES), the method 1000 may return to the candidate location determining operation of block 1002. In other embodiments, the method 1000 may merely wait until predicted/observed winds are sufficiently weak to allow aerial drone operation.

In response to determining that wind conditions allow the aerial drone to fly safely (block 1004=NO), the method 1000 continues by determining whether there are multiple candidate locations (block 1006). The determination of whether there are multiple candidate locations may be made locally at the aerial drone and/or remotely (e.g., at a central server).

In response to determining that there is a single candidate location (block 1006=NO), the method 1000 continues with the aerial drone being dispatched directly to the single candidate location (block 1010, described in greater detail below). The aerial drone may be dispatched to the single candidate location by a central server, or the aerial drone may dispatch itself.

In response to determining that there are multiple candidate locations (block 1006=YES), the method 1000 continues by determining an optimized flight path for an aerial drone (block 1008). The optimized flight path comprises a sequence of sites each corresponding to one of the plurality of candidate locations. For example, the determination of an optimized flight path may include utilizing traveling salesman problem (TSP) optimization constrained by flight time available to the aerial drone (i.e., power) and prioritized by frequency of historical incident and severity of forecast road surface condition. Accordingly, the optimized flight path may be limited to "highest priority" candidate locations (as prioritized by frequency of historical incident and severity of forecast road surface condition) that can be visited within the flight time available to the aerial drone. In some embodiments, if a candidate location has recently been observed by an aerial drone, the priority of that candidate location may be reduced. Severity of forecast road surface condition may be modelled-data obtained by, for example, a prediction model such as the FASST model. Frequency of historical incident may be mined-data obtained by, for example, accessing one or more vehicle accident history databases typically maintained by auto insurance companies and government entities (e.g., various state, county, and/or local Department of Transportation (DOT) entities). Preferably, only vehicle accidents that occurred during meteorological conditions similar to those used in the prediction model are included when determining the frequency of historical incident. The determination of an optimized flight path may be made locally at the aerial drone and/or remotely (e.g., at a central server).

In some embodiments, an optimized flight path may be determined for each of multiple aerial drones. The respective optimized flight paths may be determined using multiple-traveling salesman problem (mTSP) optimization.

Next, the method 1000 continues with the aerial drone being dispatched to a first site within the sequence of sites that comprise the optimized flight path (block 1010). The aerial drone may be dispatched to the first site by a central server, or the aerial drone may dispatch itself.

The method 1000 then continues by assessing, using a sensor onboard the aerial drone, a road surface condition at the first site (block 1012). For example, a spectroradiometer onboard the aerial drone may be configured to detect light of one or more wavelengths reflected from a road surface at the first site, wherein the one or more wavelengths are within a range of wavelengths defined by visible and near-infrared (VNIR) light and short-wavelength infrared (SWIR) light. In another example, a mobile road condition sensor onboard the aerial drone may be configured to detect light reflected from a road surface at the first site. Additionally, an infrared temperature sensor onboard the aerial drone may be configured to measure a road surface temperature at the first site. The road surface condition at the first site is assessed (e.g., "dry", "wet", "icy", "snowy", and the like) based on the sensor output using one or more techniques well known in the art. For example, the road surface condition at the first site may be assessed by analyzing the sensor output at one or more wavelengths (e.g., $\lambda_1$, $\lambda_2$, and/or $\lambda_3$) and/or one or more ratios thereof (e.g., $\lambda_1/\lambda_2$, $\lambda_1/\lambda_3$, and/or $\lambda_2/\lambda_3$) against the sensor output for known road surface conditions. Typically, the assessment operation of block 1012 is performed locally at the aerial drone, but may be performed, at least partially, remotely (e.g., at a central server).

In some embodiments, the assessment operation of block 1012 is performed by multiple aerial drones, each assessing a road surface condition at a respective first site.

Next, the method 1000 may continue by checking whether new information is available (block 1014). New information that may become available includes, but is not limited to, new forecast road surface conditions, new meteorological data (e.g., a new weather forecast, a new report of current weather conditions, new wind speed data, etc.), and the like. For example, new meteorological data may render the optimized flight path determined in block 1008 less than optimal because, in some embodiments, that determination utilizes TSP optimization prioritized by severity of forecast road surface condition and frequency of historical incident (each of which is impacted by meteorological data). In response to finding that new information is available in block 1014, the method 1000 may determine an updated optimized flight path. The check of whether new information is available and/or the determination of the updated optimized flight path may be made locally at the aerial drone and/or remotely (e.g., at a central server).

In some embodiments, in response to finding that new information is available in block 1014, the method 1000 may determine an updated optimized flight path for each of multiple aerial drones. New information that may become available additionally includes, but is not limited to, new information relating to one or more of the multiple aerial drones (e.g., one of the aerial drones has suddenly become unable to compete its optimized flight path).

The method 1000 then continues by determining, based on the assessing operation of block 1012, whether an observed dangerous road surface condition exists at the first site (block 1016). In some embodiments, certain road surface condition assessments (e.g., "icy" and/or "pooled water") obtained in the assessing operation of block 1012 may be considered observed dangerous road surface conditions. In some embodiments, where rain, snow, and/or ice layer thickness is obtained in the assessing operation of block 1012, potentially hazardous deposits of rain, snow, and/or ice (each characterized by a threshold thickness) may be considered observed dangerous road surface conditions. The determination of whether an observed dangerous road surface condition exist at the first site may be made locally at the aerial drone and/or remotely (e.g., at a central server).

In response to determining that an observed dangerous road surface condition does not exist at the first site (block 1016=NO), the method 1000 returns to the dispatching operation of block 1010 in which the aerial drone is dispatched to the next site. This loop back repeats for all the sites n=1:N (as denoted in block 1018).

In response to determining that the observed dangerous road surface condition exists at the first site (block 1016=YES), the method 1000 continues by performing one or more actions to improve safety at the first site (block 1020). For example, the aerial drone may hover over the first site and flash a warning light. Other examples of actions that may be taken to improve safety at the first site include, but are not limited to, sending a text message to one or more approaching vehicles, alerting one or more local authorities (e.g., central dispatcher), reducing a speed limit on one or more nearby electronic road signs, and placing a caution message on one or more nearby programmable road signs. The take action operation of block 1020 may be initiated locally at the aerial drone and/or remotely (e.g., at a central server). The method 1000 may then return to the dispatching operation of block 1010 in which the aerial drone is dispatched to the next site. This loop back repeats for all the sites n=1:N (as denoted in block 1018).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A method of assessing road surface condition, the method comprising:
    determining a plurality of candidate locations for consideration with respect to inclusion within an optimized flight path for an aerial drone,
    wherein each of the candidate locations is forecast to have a dangerous road surface condition,
    wherein determining a plurality of candidate locations each forecast to have a dangerous road surface condition includes utilizing both model-forecast locations considered hazardous and data-mined locations considered hazardous,
    wherein the model forecast locations considered hazardous are obtained by a prediction model using both meteorological data and terrain data,
    wherein the data mined locations considered hazardous are obtained by accessing one or more vehicle accident history databases each including meteorological data for each vehicle accident, and
    wherein determining a plurality of candidate locations each forecast to have the dangerous road surface condition includes matching the meteorological data for each vehicle accident against the meteorological data used in the prediction model so that only vehicle accidents that occurred during meteorological conditions similar to those used in the prediction model are included among the data-mined locations considered hazardous;
    determining the optimized flight path for the aerial drone, wherein the optimized flight path comprises a sequence of sites each corresponding to one of the plurality of candidate locations;
    dispatching the aerial drone to a first site within the sequence of sites that comprise the optimized flight path;
    assessing, using a sensor onboard the aerial drone, a road surface condition at the first site.

2. The method as recited in claim 1, wherein determining an optimized flight path for an aerial drone includes utilizing traveling salesman problem (TSP) optimization constrained by flight time available to the aerial drone and prioritized by frequency of historical incident and severity of forecast road surface condition, wherein the severity of forecast road surface condition is modelled-data obtained by a prediction model using meteorological data, wherein the frequency of historical incident is mined-data obtained by accessing one or more vehicle accident history databases each including meteorological data for each vehicle accident, and wherein determining an optimized flight path for an aerial drone includes matching the meteorological data for each vehicle accident against the meteorological data used in the prediction model so that only vehicle accidents that occurred during meteorological conditions similar to those used in the prediction model are included when determining the frequency of historical incident.

3. The method as recited in claim 1, further comprising determining whether an observed dangerous road surface condition exists at the first site based on the assessing operation.

4. The method as recited in claim 3, further comprising performing one or more actions to improve safety at the first site responsive to determining that the observed dangerous road surface condition exists at the first site.

5. The method as recited in claim 4, wherein performing one or more actions to improve safety at the first site includes the aerial drone hovering over the first site and flashing a warning light.

6. The method as recited in claim 4, wherein performing one or more actions to improve safety at the first site includes at least one of sending a text message to one or more approaching vehicles, alerting one or more local authorities, reducing a speed limit on one or more nearby electronic road signs, and placing a caution message on one or more nearby programmable road signs.

7. The method as recited in claim 1, further comprising checking, after dispatching the aerial drone to the first site and before dispatching the aerial drone to a second site within the sequence of sites that comprise the optimized flight path, whether new information is available.

8. The method as recited in claim 7, determining an updated optimized flight path in response to the checking operation finding that new information is available.

9. The method as recited in claim 1, wherein assessing, using a sensor onboard the aerial drone, a road surface condition at the first site includes using a spectroradiometer configured to detect light of one or more wavelengths reflected from a road surface at the first site, and wherein the one or more wavelengths are within a range of wavelengths defined by visible and near-infrared (VNIR) light and short-wavelength infrared (SWIR) light.

10. The method as recited in claim 9, wherein assessing, using a sensor onboard the aerial drone, a road surface condition at the first site further includes using an infrared temperature sensor configured to measure a road surface temperature at the first site.

11. The method as recited in claim 1, wherein assessing, using a sensor onboard the aerial drone, a road surface condition at the first site includes using a mobile road condition sensor configured to detect light reflected from a road surface at the first site.

12. The method as recited in claim 11, wherein assessing, using a sensor onboard the aerial drone, a road surface condition at the first site further includes using an infrared temperature sensor configured to measure a road surface temperature at the first site.

13. A system for assessing road surface condition, the system comprising: one or more processors, one or more computer readable storage devices, and program instructions stored on at least one of the one or more computer readable storage devices for execution by at least one of the one or more processors, the program instructions executable to: determine a plurality of candidate locations for consideration with respect to inclusion within an optimized flight path for an aerial drone, wherein each of the candidate locations is forecast to have a dangerous road surface condition, wherein the program instructions executable to determine the plurality of candidate locations utilize both model-forecast locations considered hazardous and data-mined locations considered hazardous, wherein the model-forecast locations considered hazardous are obtained by a prediction model using both meteorological data and terrain data, wherein the data-mined locations considered hazardous are obtained by accessing one or more vehicle accident history databases each including meteorological data for each vehicle accident, and wherein determining a plurality of candidate locations each forecast to have the dangerous road surface condition includes matching the meteorological data for each vehicle accident against the meteorological data used in the prediction model so that only vehicle accidents that occurred during meteorological conditions similar to those used in the prediction model are included among the data-mined locations considered hazardous; determine the optimized flight path for the aerial drone, wherein the optimized flight path comprises a sequence of sites each corresponding to one of the plurality of candidate locations; dispatch the aerial drone to a first site within the sequence of sites that comprise the optimized flight path; assess, using a sensor onboard the aerial drone, a road surface condition at the first site.

14. The system as recited in claim 13, wherein the program instruction executable to determine the optimized flight path utilize traveling salesman problem (TSP) optimization constrained by flight time available to the aerial drone and prioritized by frequency of historical incident and severity of forecast road surface condition, wherein the severity of forecast road surface condition is modelled-data obtained by a prediction model using meteorological data, wherein the frequency of historical incident is mined-data obtained by accessing one or more vehicle accident history databases each including meteorological data for each vehicle accident, and wherein determining an optimized flight path for an aerial drone includes matching the meteorological data for each vehicle accident against the meteorological data used in the prediction model so that only vehicle accidents that occurred during meteorological conditions similar to those used in the prediction model are included when determining the frequency of historical incident.

15. The system as recited in claim 13, further comprising the program instructions executable to:

determine whether an observed dangerous road surface condition exists at the first site based on the assessing operation;
perform one or more actions to improve safety at the first site responsive to determining that the observed dangerous road surface condition exists at the first site.

16. A computer program product for assessing road surface condition, the computer program product comprising a computer readable storage medium having program code embodied therewith, the program code executable by one or more processors, to perform a method comprising: determining a plurality of candidate locations for consideration with respect to inclusion within an optimized flight path for an aerial drone, wherein each of the candidate locations is forecast to have a dangerous road surface condition, wherein determining a plurality of candidate locations each forecast to have the dangerous road surface condition includes utilizing both model-forecast locations considered hazardous and data-mined locations considered hazardous, wherein the model-forecast locations considered hazardous are obtained by a prediction model using both meteorological data and terrain data, wherein the data-mined locations considered hazardous are obtained by accessing one or more vehicle accident history databases each including meteorological data for each vehicle accident, and wherein determining a plurality of candidate locations each forecast to have a dangerous road surface condition includes matching the meteorological data for each vehicle accident against the meteorological data used in the prediction model so that only vehicle accidents that occurred during meteorological conditions similar to those used in the prediction model are included among the data-mined locations considered hazardous;
determining the optimized flight path for the aerial drone, wherein the optimized flight path comprises a sequence of sites each corresponding to one of the plurality of candidate locations;
dispatching the aerial drone to a first site within the sequence of sites that comprise the optimized flight path;
assessing, using a sensor onboard the aerial drone, a road surface condition at the first site.

17. The computer program product as recited in claim 16, wherein determining an optimized flight path for an aerial drone includes utilizing traveling salesman problem (TSP) optimization constrained by flight time available to the aerial drone and prioritized by frequency of historical incident and severity of forecast road surface condition, wherein the severity of forecast road surface condition is modelled-data obtained by a prediction model using meteorological data, wherein the frequency of historical incident is mined-data obtained by accessing one or more vehicle accident history databases each including meteorological data for each vehicle accident, and wherein determining an optimized flight path for an aerial drone includes matching the meteorological data for each vehicle accident against the meteorological data used in the prediction model so that only vehicle accidents that occurred during meteorological conditions similar to those used in the prediction model are included when determining the frequency of historical incident.

* * * * *